US012493361B2

United States Patent
Tsai et al.

(10) Patent No.: US 12,493,361 B2
(45) Date of Patent: Dec. 9, 2025

(54) DISPLAY DEVICE AND REVERSE CONTROL METHOD THEREOF

(71) Applicant: REALTEK SEMICONDUCTOR CORPORATION, Hsinchu (TW)

(72) Inventors: Yun-Ting Tsai, Hsinchu (TW); Liang-Liang Song, Suzhou (CN); Cheng-Shun Liao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/752,845

(22) Filed: Jun. 25, 2024

(65) Prior Publication Data

US 2025/0004573 A1 Jan. 2, 2025

(30) Foreign Application Priority Data

Jun. 30, 2023 (CN) .......................... 202310790854.3

(51) Int. Cl.
*G06F 3/02* (2006.01)
*G09G 5/00* (2006.01)
*H04N 21/4363* (2011.01)

(52) U.S. Cl.
CPC .......... *G06F 3/0227* (2013.01); *G09G 5/006* (2013.01); *H04N 21/43635* (2013.01); *G09G 2370/06* (2013.01)

(58) Field of Classification Search
CPC ........ G06F 3/14; G06F 3/04842; G09G 5/006
See application file for complete search history.

(56) References Cited

U.S. PATENT DOCUMENTS

| 8,896,611 B2 | 11/2014 | Tang et al. | |
| 2006/0238526 A1* | 10/2006 | Kim | ........................ G09G 5/006 345/204 |
| 2006/0246931 A1* | 11/2006 | Kim | .................... G06F 13/4286 455/507 |
| 2009/0135304 A1* | 5/2009 | Inoue | ..................... G09G 5/006 348/712 |

(Continued)

FOREIGN PATENT DOCUMENTS

| CN | 115396520 A | 11/2022 |
| CN | 115543885 A | 12/2022 |

(Continued)

OTHER PUBLICATIONS

OA letter of a counterpart TW application (appl. No. 112129157) mailed on Jun. 21, 2024.

(Continued)

*Primary Examiner* — Nan-Ying Yang
(74) *Attorney, Agent, or Firm* — WPAT, PC

(57) ABSTRACT

A reverse control method includes the following operations: connecting an electronic device through an image transmission interface in a display device to receive image data from the electronic device and display the image data; connecting a control device through the display device to receive a first command from the control device; and transmitting, by the control device, the first command to the electronic device through the image transmission interface to operate as a human interface device connected to the electronic device, such that the electronic device operates in response to the first command.

13 Claims, 3 Drawing Sheets

(56) References Cited

U.S. PATENT DOCUMENTS

| | | | | |
|---|---|---|---|---|
| 2009/0251606 A1* | 10/2009 | Tokoro | ................... | G09G 5/006 |
| | | | | 348/554 |
| 2015/0135072 A1* | 5/2015 | Agnihotri | ............ | H04N 21/443 |
| | | | | 715/716 |
| 2018/0091758 A1* | 3/2018 | Lee | ..................... | G06F 13/4282 |

FOREIGN PATENT DOCUMENTS

| | | | |
|---|---|---|---|
| CN | 115809035 A | | 3/2023 |
| CN | 116088780 A | | 5/2023 |
| CN | 116339603 A | | 6/2023 |

OTHER PUBLICATIONS

OA letter of a counterpart TW application (appl. No. 112129157) mailed on Mar. 6, 2024.

* cited by examiner

DISPLAY DEVICE AND REVERSE CONTROL METHOD THEREOF

BACKGROUND OF THE DISCLOSURE

1. Field of the Disclosure

The present disclosure relates to a display device and a reverse control method thereof that are able to reverse control a signal source through an image transmission interface.

2. Description of Related Art

In most applications, electronic devices may be connected to a display device through an image transmission interface and provide image data to the display device to generate corresponding image contents. Generally, electronic devices are controlled through input/output devices that are directly connected to the electronic device itself. In some applications, if the display device is connected to input/output devices and has reverse control capabilities, the electronic device may also be controlled in reverse by the input/output devices connected to the display device. In existing approaches, the reverse control function is based on outdated transmission interfaces, which are not suitable for current mainstream transmission interfaces. On the other hand, if the reverse control function is established on the image transmission protocol, it may interfere with the original image data transmission.

SUMMARY OF THE DISCLOSURE

In some aspects of the present disclosure, an object of the present disclosure is, but not limited to, provide a display device and a reverse control method thereof, so as to make an improvement to the prior art.

In some aspects of the present disclosure, a display device includes a controller circuit, an image transmission interface circuit, and an input/output interface circuit. The image transmission interface circuit is connected to an electronic device through an image transmission interface to receive image data transmitted by the electronic device, in order to display the image data through the controller circuit. The input/output interface circuit is connected to a control device to receive a first command from the control device, in which the control device transmits the first command to the electronic device through the image transmission interface, in order to operate as a human interface device connected to the electronic device, such that the electronic device operates in response to the first command.

In some aspects of the present disclosure, a reverse control method includes the following operations: connecting an electronic device through an image transmission interface in a display device to receive image data from the electronic device and display the image data; connecting a control device through the display device to receive a first command from the control device; and transmitting, by the control device, the first command to the electronic device through the image transmission interface to operate as a human interface device connected to the electronic device, such that the electronic device operates in response to the first command.

These and other objectives of the present disclosure will no doubt become obvious to those of ordinary skill in the art after reading the following detailed description of the preferred embodiments that are illustrated in the various figures and drawings

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may be a single system formed with at least one circuit, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
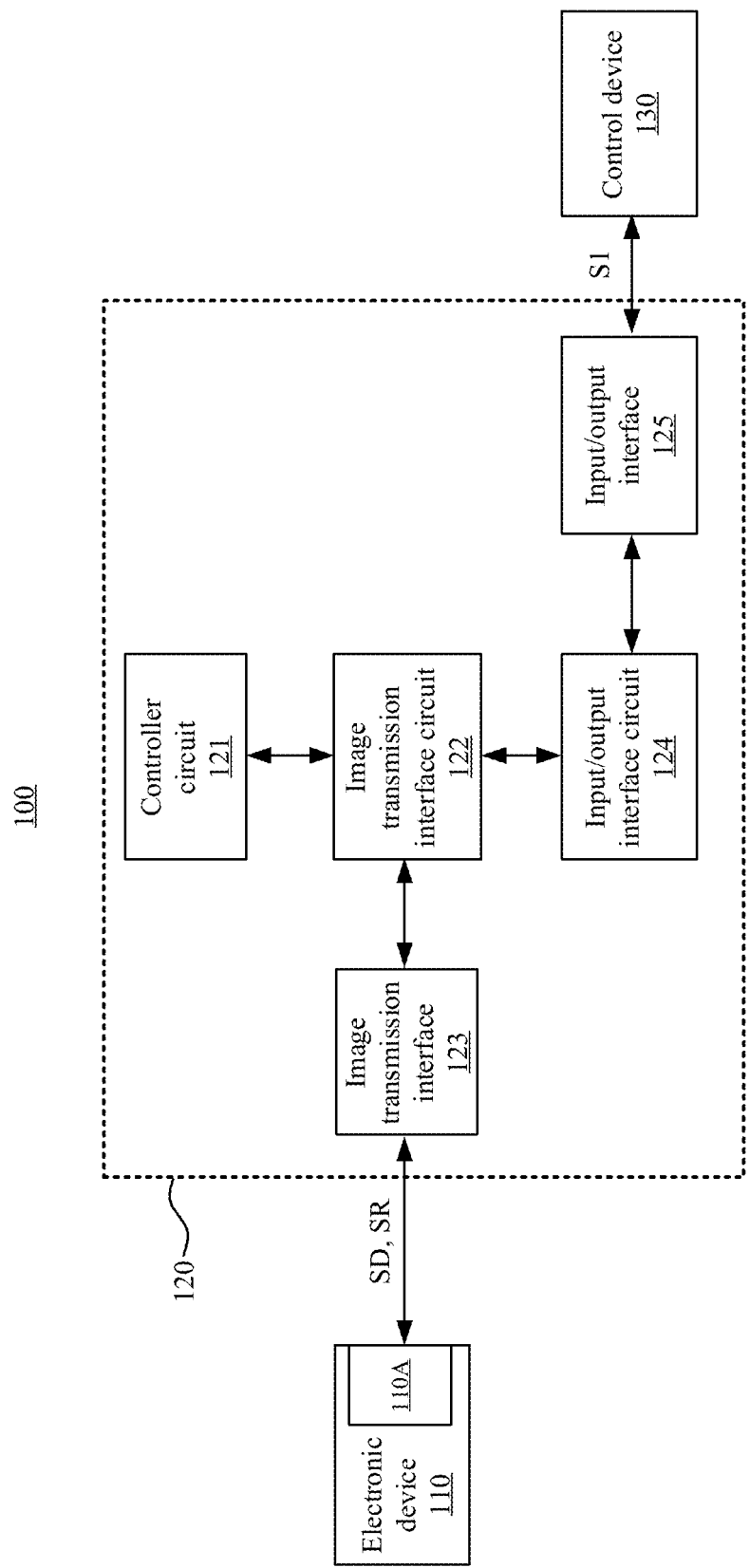
FIG. 1 illustrates a schematic diagram of a display system according to some embodiments of the present disclosure.

FIG. 1 illustrates a schematic diagram of a display system 100 according to some embodiments of the present disclosure. The display system 100 includes an electronic device 110, a display device 120, and a control device 130. In some embodiments, the electronic device 110 may be various devices having an image transmission interface 110A. For example, the electronic device 110 may be, but is not limited to, a laptop, a desktop computer, a tablet, and/or the like, etc. In some embodiments, the display device 120 may be, but is not limited to, a screen, a projector, and/or the like, etc. In some embodiments, the control device 130 may be, but is not limited to, a keyboard, a mouse, a writing pad, a remote control, a touchpad (or touchscreen), or a combination thereof. In various embodiments, the control device 130 may be a device that allows users to input command(s).

The display device 120 includes a controller circuit 121, an image transmission interface circuit 122, an image transmission interface 123, an input/output (I/O) interface circuit 124, and an input/output interface 125. The controller circuit 121 may control the timing of the image transmission interface circuit 122 and the input/output interface circuit 124, and may be configured to display image data SD transmitted from the electronic device 110. For example, if the display device 120 is a television, the controller circuit 121 may control the panel driver (not shown) in the television to display the corresponding content of the image data SD. Alternatively, if the display device 120 is a projector, the controller circuit 121 may control the light source (not shown) in the projector to project the corresponding content of the image data SD. In some embodiments, the controller circuit 121 may be implemented with one or more digital circuits. In some embodiments, the controller circuit 121 may execute software (or drivers), thereby controlling the image transmission interface circuit 122 and the input/output interface circuit 124.

The image transmission interface circuit 122 may be connected to the electronic device 110 through the image transmission interface 123, to receive the image data SD and a read command SR transmitted from the electronic device 110. In some embodiments, the image transmission interface 123 may be a high-definition multimedia interface (HDMI). In other embodiments, the image transmission interface 123 may be a DisplayPort. The aforementioned types of the image transmission interface 123 are given for illustration purposes, and the present disclosure is not limited thereto.

The input/output interface circuit 124 is connected to the control device 130 through the input/output interface 125, to receive a command S1 issued by the control device 130. In some embodiments, the input/output interface 125 may include, but is not limited to, universal serial bus (USB), PS/2 interface, I$^2$C, serial peripheral interface (SPI), 2.4 GHz Wireless, infrared data association (IrDA), Bluetooth (BT), Wireless LAN, Ethernet, and/or other subsequent interfaces that may support connection with input devices such as keyboard, mouse, or the like. In some embodiments, the input/output interface circuit 124 may include a controller circuit that supports the inter-integrated circuit (I$^2$C) protocol, which may assign a slave address to the control device 130. Thus, the input/output interface circuit 124 may be connected to the control device 130 through this slave address to receive the command S1 or to feedback data and/or commands to the control device 130 (for example, the aforementioned read command SR).

In some embodiments, the image transmission interface circuit 122 may transmit the command S1 issued by the control device 130 to the electronic device 110 through the image transmission interface 123, thereby allowing the control device 130 to control the electronic device 110. In some embodiments, the electronic device 110 is installed with a driver or system that provides a function that may simulate a device connected through a specific channel in the image transmission interface 123 as a human interface device (HID). For example, the control device 130 may be connected to the electronic device 110 through a display data channel in the image transmission interface 123 and transmit the command S1 to the electronic device 110 through this display data channel. In some embodiments, if the image transmission interface 123 is a HDMI, the electronic device 110 may utilize this driver to treat commands or data received at pin 16 (which corresponds to the display data channel) of the image transmission interface 110A (which may also be an HDMI) of the electronic device 110 as commands or data issued by a human interface device. As a result, the electronic device 110 may be controlled by the control device 130 connected to the display device 120 (equivalently, the electronic device 110 is controlled by the control device 130 in reverse). For example, the control device 130 may input commands to execute software, applications, etc., in the electronic device 110. Detailed configurations regarding herein will be given with reference to FIG. 2.

In general, the electronic device 110 may only be controlled by input devices directly connected to the electronic device 110 itself. With the above configurations, the electronic device 110 may be controlled by the control device 130 connected to the display device 120 in reverse. In other words, in a first mode, the display device 120 may be controlled by the control device 130. In a second mode, when the display device 120 receives the image data SD from the electronic device 110, the display device 120 may transmit the command S1 from the control device 130 to the electronic device 110 through the image transmission interface 123, such that the electronic device 110 is controlled by the control device 130. Thus, the electronic device 110 and the display device 120 may share the same control device 130, in order to reduce the overall number of input devices and provide variety of manipulation ways.

Figure 2:
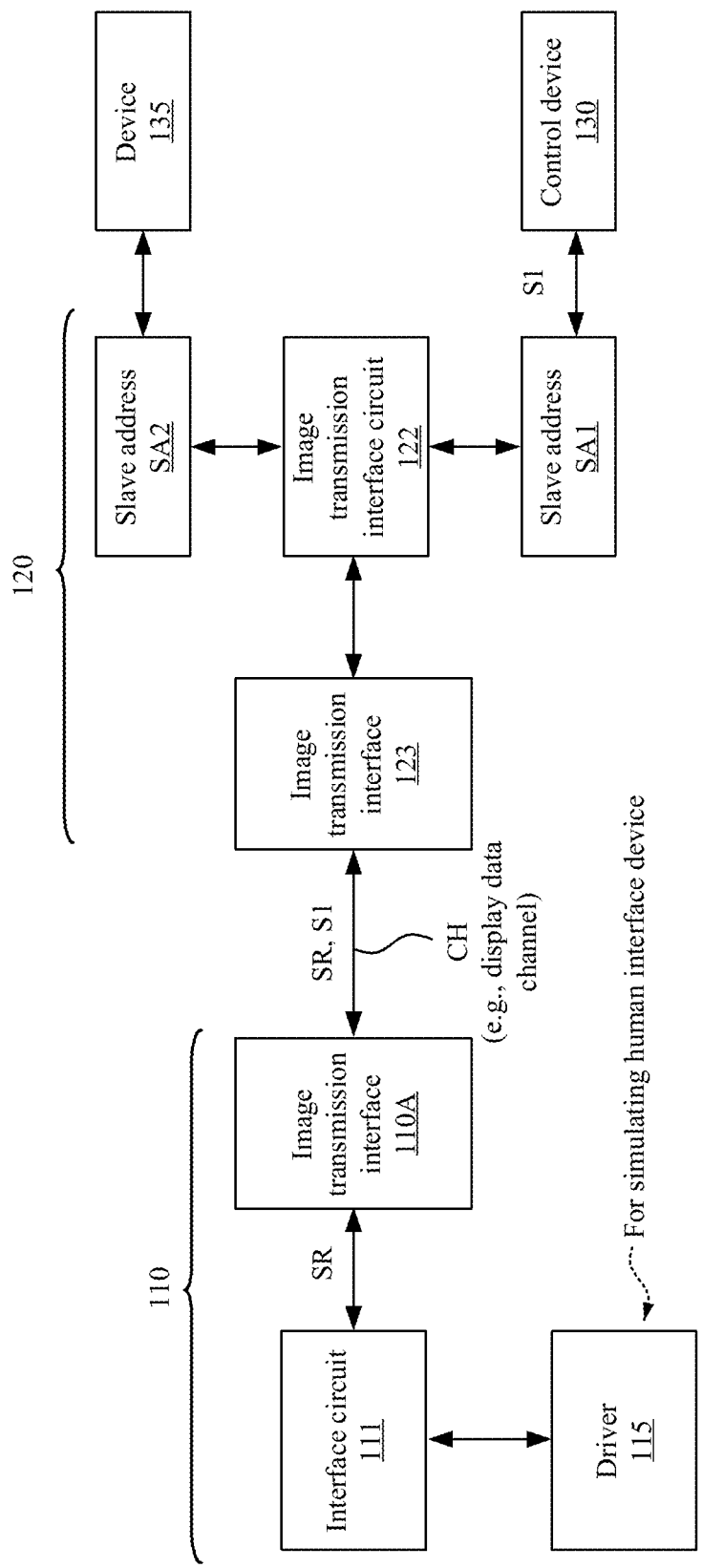
FIG. 2 illustrates a schematic diagram of operations among the electronic device, the image transmission interface circuit, the image transmission interface, and the control device in FIG. 1 according to some embodiments of the present disclosure.

FIG. 2 illustrates a schematic diagram of operations among the electronic device 110, the image transmission interface circuit 122, the image transmission interface 123, and the control device 130 in FIG. 1 according to some embodiments of the present disclosure. For ease of understanding, FIG. 2 only shows the operations between parts of the circuit mainly related to the aforementioned human interface device and does not show other circuits in FIG. 1.

As shown in FIG. 2, the electronic device 110 may be installed with a driver (or driver software or system default function) 115, which may simulate the signals received through a specific channel CH (for example, the aforementioned display data channel) in the image transmission interface 123 as signals from a human interface device. In greater detail, in some embodiments, the electronic device 110 includes an interface circuit 111, which may operate as a master control end of the I$^2$C bus. The driver 115 and the interface circuit 111 may cooperate with each other to simulate the control device 130 as the aforementioned human interface device, such that the electronic device 110 operates in response to the command S1 from the control device 130. In some embodiments, the driver 115 may refer to a driver in an existing operating systems that recognizes external devices, thereby simulating the signals from a specific transmission interface pins (for example, the pin 16 in the aforementioned HDMI) as signals emitted by a human interface device.

On the other hand, the image transmission interface circuit 122 may transmit the command S1 of the control device 130 to the interface circuit 111 through the specific channel CH in the image transmission interface 123. In greater detail, the image transmission interface circuit 122 (and/or the input/output interface circuit 124) may operate as a slave end of the I$^2$C Bus, and assign a slave address SA1 to the control device 130, in order to connect and communicate with the control device 130 through the slave address SA1. Based on the I$^2$C protocol, the electronic device 110 may send the read command SR to the slave address SA1 through the specific channel CH, and the control device 130 may receive this read command SR and send device information related to the control device 130 (including, but not limited to, the device type of the control device 130, such as a keyboard or mouse, etc.) in response to this read command SR, such that the electronic device 110 may determine, through the driver 115, whether to simulate the control device 130 as the human interface device connected to the electronic device 110. After the control device 130 is determined to be simulated as the human interface device, the control device 130 may issue the command S1 to control the electronic device 110.

Furthermore, as shown in FIG. 2, in different applications, there may also be other devices connected to the display device 120, to transmit commands or data to the interface circuit 111 through the specific channel CH. For example, the image transmission interface circuit 122 may assign another slave address SA2 to a device 135, in which the device 135 may be, but is not limited to, an electronic device that performs data transmission based on the Extended Display Identification Data (EDID) protocol or the High-Bandwidth Digital Content Protection (HDCP) protocol. Based on the I$^2$C bus protocol, the control device 130 is configured to correspond to the slave address SA1, and the device 135 is configured to correspond to the slave address SA2, in which the slave address SA1 is different from the slave address SA2. Thus, the control device 130 and the device 135 may share the specific channel CH to communicate with the electronic device 110 without causing conflicts. In other words, the image transmission interface circuit 122 may utilize the characteristics of the I$^2$C bus protocol to assign different slave addresses to different devices, allowing these devices to commonly utilize the aforementioned display data channel without interfering with each other. In this way, the control device 130 may control the electronic device 110 in reverse without affecting the data transmission of other existing protocols and may fully utilize the channel bandwidth of the specific channel CH.

In some related approaches, the input/output devices connected to the display device utilize the aforementioned EDID protocol or HDCP protocol to reverse control the electronic device that provides image data. In these approaches, commands issued by input/output devices that share the same display data channel may affect the data transmitted through the EDID or HDCP protocols, which leads to abnormal image display. To transmit additional information from the input/output devices, it is required to modify fields within the EDID data. However, depending on different applications, the EDID data may have different settings or no spare fields available, which makes it difficult to implement reverse control of the input/output devices. Additionally, the HDCP protocol employs an interactive process to transmit commands, which is not suitable for input/output devices. Using the HDCP protocol to transmit commands for input/output devices would result in unnecessary bandwidth loss. Furthermore, if the display device employs the aforementioned EDID or HDCP protocols for reverse control, the corresponding drivers in the reverse-controlled electronic device would need to be modified, leading to changes in the existing software and/or hardware architecture under those protocols. Compared with the above approaches, in some embodiments of the present disclosure, the display device 120 may assign the slave address SA1 (different from the slave address SA2 already used by the device 135) to the control device 130 based on the I$^2$C bus protocol. As a result, the control device 130 may utilize the same specific channel CH to transmit the command S1 without affecting the original signal transmission of the device 135 or the display device 120, thereby fully utilizing the bandwidth of the specific channel CH. Moreover, the electronic device 110 only needs to install the additional driver 115 to simulate the control device 130 as a human interface device, without the need to modify drivers corresponding to other existing transmission protocols.

Figure 3:
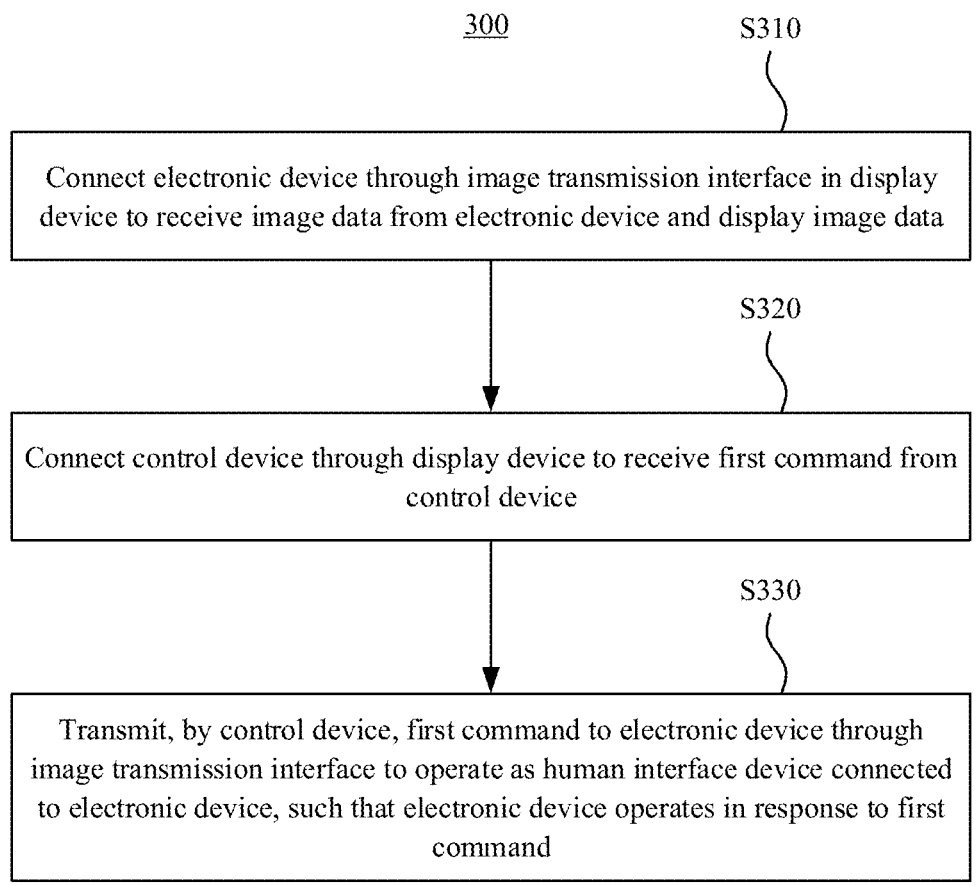
FIG. 3 illustrates a flowchart of a reverse control method according to some embodiments of the present disclosure.

FIG. 3 illustrates a flowchart of a reverse control method 300 according to some embodiments of the present disclosure. In operation S310, an electronic device is connected through an image transmission interface in a display device to receive image data from the electronic device and display the image data. In operation S320, a control device is connected through the display device to receive a first command from the control device. In operation S330, the first command is transmitted, by the control device, to the electronic device through the image transmission interface to operate as a human interface device connected to the electronic device, such that the electronic device operates in response to the first command.

Operations in the reverse control method 300 can be understood with reference to descriptions of above embodiments, and thus repetitious descriptions are not further given herein. The above description of operations includes exemplary operations, but the operations are not necessarily performed in the order described above. Operations of the reverse control method 300 may be added, replaced, changed order, and/or eliminated, or may be performed simultaneously or partially simultaneously as appropriate, in accordance with the spirit and scope of various embodiments of the present disclosure.

As described above, a display device and a reverse control method provided in some embodiments of the present disclosure may assign different slave addresses to control devices connected to the display device based on I$^2$C bus protocol. As a result, it is able to reverse control electronic device(s) providing image data through a channel shared with other existing protocols, without interfering with the transmission of these existing protocols.

Various functional components or blocks have been described herein. As will be appreciated by persons skilled in the art, in some embodiments, the functional blocks will preferably be implemented through circuits (either dedicated circuits, or general-purpose circuits, which operate under the control of one or more processors and coded commands), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:
1. A display device, comprising:
 a controller circuit;
 an image transmission interface circuit connected to an electronic device through an image transmission inter- face to receive image data transmitted by the electronic device, in order to display the image data through the controller circuit, wherein the image transmission interface is a high-definition multimedia interface (HDMI), and the image transmission interface circuit transmits the first command to the electronic device through a display data channel of the high-definition multimedia interface; and an input/output interface circuit connected to a control device to receive a first command from the control device, wherein the control device transmits the first command to the electronic device through the image transmission interface, in order to operate as a human interface device connected to the electronic device, such that the electronic device operates in response to the first command; and wherein the electronic device is configured to issue a read command to the first slave address through an inter-integrated circuit ($I^2C$) protocol, and the control device is configured to transmit the first command to the electronic device through the image transmission interface in response to the read command, in order to operate as the human interface device connected to the electronic device.

2. The display device of claim 1, wherein the image transmission interface is a high-definition multimedia interface (HDMI), and the image transmission interface circuit transmits the first command to the electronic device through a display data channel of the high-definition multimedia interface.

3. The display device of claim 1, wherein the image transmission interface circuit is further configured to assign a second slave address to a first device that is configured to perform a data transmission based on an extended display identification data (EDID) protocol or a high-bandwidth digital content protection (HDCP) protocol, and the first slave address is different from the second slave address.

4. The display device of claim 1, wherein the control device operates as the human interface device for controlling the electronic device through a driver of the electronic device.

5. The display device of claim 1, wherein when the image transmission interface circuit receives the image data, the control device transmits the first command to the electronic device through the image transmission interface.

6. The display device of claim 1, wherein the electronic device comprises one of a laptop, a desktop computer, or a tablet.

7. The display device of claim 1, wherein the control device comprises a keyboard, a mouse, a writing pad, a remote control, a touchpad, or a combination thereof.

8. A reverse control method, comprising:
connecting an electronic device through an image transmission interface in a display device to receive image data from the electronic device and display the image data;
connecting a control device through the display device to receive a first command from the control device; and
transmitting, by the control device, the first command to the electronic device through the image transmission interface to operate as a human interface device connected to the electronic device, such that the electronic device operates in response to the first command, comprising:
issuing, by the electronic device, a read command to the first slave address through an inter-integrated circuit bus protocol; and
transmitting, by the control device, the first command to the electronic device through the image transmission interface in response to the read command, in order to operate as the human interface device connected to the electronic device; and
assigning, by the display device, a first slave address to the control device, and connecting to the control device through the first slave address.

9. The reverse control method of claim 8, wherein the display device is further configured to assign a second slave address to a first device that is configured to perform a data transmission based on an extended display identification data (EDID) protocol or a high-bandwidth digital content protection (HDCP) protocol, and the first slave address is different from the second slave address.

10. The reverse control method of claim 8, wherein the control device operates as the human interface device for controlling the electronic device through a driver of the electronic device.

11. The reverse control method of claim 8, wherein the image transmission interface is a high-definition multimedia interface (HDMI), and the first command is transmitted to the electronic device through a display data channel of the high-definition multimedia interface.

12. The reverse control method of claim 8, wherein the electronic device comprises one of a laptop, a desktop computer, or a tablet.

13. The reverse control method of claim 8, wherein the control device comprises a keyboard, a mouse, a writing pad, a remote control, a touchpad, or a combination thereof.

* * * * *